United States Patent [19]
Cocks

[11] Patent Number: 5,336,303
[45] Date of Patent: Aug. 9, 1994

[54] ELECTROCHEMICALLY ACTIVE PAINT FOR CATHODIC PROTECTION OF ENGINEERING STRUCTURES

[75] Inventor: Elijah E. Cocks, Durham, N.C.

[73] Assignee: C-Innovations, Inc., Research Triangle Park, N.C.

[21] Appl. No.: 116,223

[22] Filed: Sep. 2, 1993

Related U.S. Application Data

[63] Continuation-in-part of Ser. No. 700,600, May 15, 1991, abandoned.

[51] Int. Cl.⁵ ............................................. C09D 5/08
[52] U.S. Cl. ........................... 106/14.05; 106/14.26; 106/14.27; 106/14.33; 106/14.39; 106/14.44; 106/419; 106/471; 106/472; 106/474; 252/502; 252/503; 252/506; 252/508; 252/509; 427/372.2; 427/384; 428/45
[58] Field of Search ............... 106/14.05, 14.26, 14.27, 106/14.33, 14.44, 419, 471, 472, 474, 14.39; 252/503, 510, 502, 506, 508, 509; 427/384, 372.2; 428/457

[56] References Cited

U.S. PATENT DOCUMENTS

| | | | |
|---|---|---|---|
| 4,081,423 | 3/1978 | Hardenfelt | 252/503 |
| 4,490,282 | 12/1984 | Corboy et al. | 252/503 |
| 4,545,926 | 10/1985 | Fouts, Jr. et al. | 252/503 |
| 5,002,826 | 3/1991 | Pollart et al. | 252/506 |

FOREIGN PATENT DOCUMENTS 57-085994  5/1982  Japan ................................. 252/503

*Primary Examiner*—Anthony Green

[57] ABSTRACT

An electrochemically active paint is disclosed which provides cathodic protection to metallic materials of construction. This paint incorporates high concentrations of conductive pigment materials in combination with both corrosion inhibiting agents and exceptionally active metal pigments that can cathodically protect the base metal to which the paint is applied even though the metal pigment particles are incorporated within the paint vehicle. Applying this paint to an engineering structure confers active cathodic protection, and the resulting painted structure is thus rendered completely immune to corrosion for the active lifetime of the paint.

4 Claims, No Drawings

ELECTROCHEMICALLY ACTIVE PAINT FOR CATHODIC PROTECTION OF ENGINEERING STRUCTURES

This is a continuation-in-part application of prior application, Ser. No. 07/700,600, filed May 15, 1991, now abandoned.

Many different paint formulations are known, as are many specific formulations aimed at the protection of metals against corrosion. These paints, however, only inhibit the corrosion of the painted structure and they do not thermodynamically prevent corrosion, as can be achieved by cathodic protection. The ability to confer absolute corrosion protection, by means of cathodic protection, has now been found to be possible by means of a paint that combines the use of extremely electrochemically active pigment metals together with substantial amounts of electrically conductive pigment powders, which render the paint substantially conductive to electricity, and with corrosion inhibiting agents, which are found to greatly increase the effective active lifetime of the paint even though the base metal is completely cathodically protected.

OBJECTS OF THE INVENTION

It is an object of the invention to produce an improved corrosion-preventing paint which has the ability to confer absolute protection against corrosion and not just corrosion inhibition to structural metals, especially steels under normal exposure conditions including seawater exposure, by means of active cathodic protection produced by means of the paint itself.

It is another object of the invention to provide a paint which can effectively prevent the spread of existing corrosion when this paint is applied over corroded areas on engineering structures.

It is still another object of this invention to simultaneously incorporate electrical-conductivity enhancing and electrochemically active substances into a paint such that the paint by itself can confer cathodic protection without the need for any external power supply.

It is a primary object of this invention to provide an electrochemically active paint coating which is capable of conferring active and complete corrosion protection over the active lifetime of the paint, even to regions of holidays in the paint coating where the paint does not completely cover the base metal

BACKGROUND OF THE INVENTION

Cathodic protection is widely used to protect steel by galvanizing this steel with metallic zinc, whose sacrificial corrosion keeps the electrochemical potential of the steel sufficiently negative that the steel does not corrode at all. Cathodic protection of steel has not previously been possible using paint instead of an applied metallic coating, or external sacrificial anodes or applied electric current.

Although a great number of different corrosion-inhibiting paints are known, such inhibiting paints only slow down the onset of corrosion and do not completely and absolutely prevent of corrosion. The present invention, by conferring cathodic protection to the base metal to which it is applied, can entirely prevent the onset of corrosion, and can even stop corrosion that has already started before the paint was applied. The present paint therefore can be applied even over rust and still be effective in preventing corrosion through active cathodic protection.

There are several known paint compositions which disclose the use of metal pigments in combination with pigments, usually carbon or graphite, added specifically to increase the conductivity of the resulting paint. Hardenfelt, in U.S. Pat. No. 4,081,423 teaches a spreading or coating composition including a metallic powder and powdered graphite. In Column 1, lines 27-35 Hardenfelt teaches the use of the metals particularly suited to his invention as being copper, bronze, iron, tin and zinc. Hardenfelt also teaches that the noble metals silver, gold, or platinum may also be used in his invention. All of the metal powders taught by Hardenfelt, except zinc, are relatively electrochemically inert. Zinc is the most electrochemically active of the metals taught by Hardenfelt, but even zinc has an electrochemical potential of only $-1.0$ volts when measured versus a calomel electrode in seawater. It has now been found that a substantial portion of the electrochemical activity of the zinc is lost by the incorporation of this zinc into a paint, even an electrically conducting paint, and as a consequence zinc cannot provide complete cathodic protection when it is thus incorporated into the paint because its electrochemical activity is effectively reduced by such incorporation. None of the metals taught by Hardenfelt will, when used in a paint, confer complete cathodic protection to steel in seawater because of the loss in the electrochemical activity of the metal pigment material which occurs when the pigment is incorporated into the paint.

Corboy, et al., in U.S. Pat. No. 4,490,282, teaches in the abstract a paint composition comprising a hardenable fluid binder, metal particles selected from the group of nickel particles, aluminum particles and mixtures thereof, carbon particles, 2, 4-pentadione and a titanate coupling agent. Corboy does not anywhere teach the use of metal pigments of extremely high electrochemical activity.

Pollart, et al., in U.S. Pat. No. 5,002,826, teaches, in the abstract, coating compositions comprising finely divided carbon, a microwave reactive metal, powdered inert solid and a binder. Pollard, et al., cite preferred metals as being aluminum, iron, nickel, copper, tin and silver, all of which are of relatively low electrochemical activity. Even aluminum, which has an electrochemical potential of $-0.98$ volts versus a saturated calomel reference electrode in seawater, will not provide complete cathodic protection because of the loss in its electrochemical activity which occurs when it is incorporated into paint. None of the metals taught by Pollart, et al. will, when used in a paint, confer complete cathodic protection to steel in seawater because of the loss in the electrochemical activity in the metal pigment material which occurs when the pigment is incorporated into the paint. Nowhere do Pollard, et al., suggest the use of metallic pigments having an exceptionally high electrochemical activity to achieve active cathodic protection or the combined use of an active metal pigment in combination with a corrosion inhibiting agent to produce an electrochemically active paint of extended active lifetime.

Fouts, Jr. et al., in U.S. Pat. No. 4,545,926, teaches, in the abstract, a polymer composition comprising a polymeric material having dispersed therein conductive particles composed of a highly conductive material and a particulate filler. Fouts, Jr., et al. teach specifically the use of nickel, tungsten, molybdenum, silver, gold, platinum, iron, aluminum, copper, tantalum, zinc, cobalt, chromium, lead, titanium and tin, and cites particularly the preferred use of nickel, tungsten, and molybdenum. None of the metals taught by Fouts, et al., are of high electrochemical activity and none would produce complete cathodic protection of iron or steel in seawater.

Japanese Patent Specification No. 57-085994 teaches, in the abstract, an electroconductive resin composition comprising a thermoplastic resin, polyurethane, carbon black, sulphur and a metal or metal sulphide powder. The metal powders include Ni, Fe, Zn, Cr, Cu, and Al. Nowhere does this specification disclose the incorporation of extremely active metal pigments.

PHYSICS OF THE METHOD

The principle of cathodic protection is fundamentally based upon the use of a voltage applied to the engineering structure to be protected so that the electrochemical potential of the engineering structure, such as a buried pipeline, is reduced enough that the metal of which the structure is composed is rendered thermodynamically stable in the environment in which it is exposed. This shift in potential can be produced either using an externally applied voltage source such as a battery or by a direct current generator but is most usually achieved by means of a sacrificial metal electrode whose electrochemically activity is sufficiently negative to achieve the desired shift in the electrochemical potential in the metal engineering structure. The most common example of cathodic protection is that of the application of metallic zinc to iron structures to produce so called galvanized steel. In such a case zinc is not incorporated into a paint vehicle but is rather directly applied to the metal which is to be protected, thus the full electrochemical activity of the zinc is directly applied to the protected structure, and the potential of the structure is brought essentially to that of the zinc. The corrosion of the zinc and its concomitant electrochemical activity prevent the corrosion of the underlying steel, even in the presence of gaps in the zinc galvanic coating. In the present case the sacrificial metal is not applied directly to the surface of the structure which is to be protected but is rather embedded in a paint vehicle. If this paint vehicle is not electrically conductive then the potential of the sacrificial metal alloy powder will not then be transferred to the structure itself. It has now been discovered that if the electrochemical potential of the sacrificial metal is very high and the conductivity of the paint body is increased tremendously by means of a high proportion of a conductive pigment such as carbon powder, then a certain proportion of the electrochemical activity will be made available to the substrate metal and will produce cathodic protection of the painted metallic structure. Thus, the process of protection consists of the formulation of a paint containing sacrificial metal powder which has exceptionally high electrochemical activity yet with an extended active lifetime and the application of this paint to the engineering structure whose cathodic protection is desired.

In the cathodic protection of iron exposed to seawater or to fresh water or to moist soils it is customary to use externally applied electric currents which drive the iron to a potential at least as negative as −0.75 volts versus a saturated calomel reference electrode to completely stop corrosion of iron or steel in any of these corrosive environments. Such cathodic protection is commonly applied to the prevention of corrosion of engineering structures in seawater, such as oil well drilling rigs. In place of directly applied electric currents supplied by a power supply, sacrificial anodes made of zinc or aluminum are also used. These sacrificial anodes, which consist typically of massive blocks of sacrificial metal, corrode and thereby supply electric currents to the structure to be protected, thus holding the potential of such structures to such a negative value, usually −0.75 volts measured versus a saturated calomel reference electrode, that corrosion of the structure is entirely prevented. Iron or steel whose electrochemical potential is not as negative as this when measured against a saturated calomel reference electrode will be found to suffer some degree of corrosion under many natural corrosion conditions, but iron whose potential is more negative than this will be found to be completely protected from corrosion under these same conditions.

DESCRIPTION OF THE INVENTION

The present invention comprises a paint that is both electrochemically active and electrically conductive. Normal paints, even those that are anticorrosive, are not normally very electrically conductive. Although known anticorrosive paints contain corrosion-inhibiting chemicals, they do not function by actively controlling the electrochemical potential of the underlying metal to which they are applied. Instead, anticorrosive paints function firstly by keeping the corrosive environment from the base metal to which they are applied by acting as a barrier to water, and secondly, by using chemical agents to inhibit corrosion from the water that inevitably penetrates the paint. Thus, corrosion protection is provided by the chemicals which the water transports to the base metal surface in its passage through the paint film. In the present invention the paint film retains the ability to exclude substantially any liquid water from the metal surface. It has now been found that the inclusion of a substantial quantity of a conducting element or elements, such as carbon black or graphite powder, into the polymer vehicle or other vehicle formulation to confer electrical conductivity to the paint film enables electrochemically active materials also incorporated into the paint film to control the electrochemical potential of the base metal substrate when the painted base metal substrate is exposed to a corrosive environment such as seawater. By further adding corrosion inhibiting agents, such as potassium dichromate, to the paint the active lifetime of this paint is found to be greatly increased beyond that of active paints which do not contain inhibiting agents. This favorable result has been found even though the base metal, being cathodically protected, does not need the presence of the inhibiting agent. While it is not known with certainty why this favorable result occurs, it is believed that the sacrificial corrosion rate of the highly active electrochemical pigment is itself decreased by the presence of the corrosion inhibiting agent, while only slightly decreasing the electrochemical potential. Because it is necessary for electric current to flow from the electrochemically active material to the base metal which is to be protected, and because the voltages produced by even these electrochemically active elements are relatively low, it is necessary that the electrical resistivity of the paint be as low as possible, but in any case less than about 100,000 ohm-centimeters and preferably less than 10,000 ohm-cm in order to achieve cathodic protection utilizing electrochemically active elements or alloys whose activity is about negative one volt when measured against a saturated calomel reference electrode. In general, the lower the resistivity the less will be the electrical loss within the paint itself and therefore the greater will be the degree of protection achieved. Thus, by decreasing the paint resistivity to 1000 or 100 ohm-cm then the effectiveness of the paint will be still further improved. For electrochemically active elements whose activity is higher, this maximum resistivity allowed in the paint increases in proportion as the electrochemical activity increases. Table I shows the as-measured electrochemical activity when exposed to seawater of a series of metals and alloys.

TABLE 1

Electrochemical activity of various metals and alloys in seawater as measured versus a saturated calomel reference electrode.

| Metal/Alloy | Potential |
|---|---|
| Calcium-30 wt % aluminum alloy | −1.95 volts |
| Magnesium-30 wt % lithium alloy | −1.87 volts |
| Magnesium | −1.80 volts |
| Magnesium-10 wt % aluminum alloy | −1.62 volts |
| Zinc | −1.00 volts |
| Aluminum | −0.98 volts |
| Antimony | −0.55 volts |
| Lead | −0.50 volts |
| Plain carbon steel | −0.46 volts |
| Tin | −0.44 volts |
| Stainless steel | −0.20 volts |
| Copper | −0.18 volts |
| Silver | −0.003 volts |
| Gold | +0.03 volts |
| Platinum | +0.08 volts |

It is seen from Table I that it has been found that calcium-30 wt % aluminum, magnesium-30 wt % lithium, magnesium-10 wt % aluminum, magnesium, zinc, and aluminum all show an electrochemical potential that is more negative than than −0.75 volts. However, this is the electrochemical potential of the bare metal unencumbered by a paint coating As may be seen from TABLE 1, alloys of calcium-aluminum and magnesium-lithium in particular are found to have extremely great electrochemical activity. By combining electrochemically active metallic substances with electrically conductive substances in a polyurethane or other paint vehicle base, even with additional anticorrosive chemicals such as potassium dichromate, it has now been found that the electrochemical activity of the underlying base metal to which the electrochemically active paint is applied will be made more negative than −0.75 volts when measured against a saturated calomel reference electrode without the need for any external source of electricity as is required by normal cathodic protection methods, even though the metal itself has lost a significant portion of its electrochemical activity by its incorporation into the paint vehicle.

PREFERRED EMBODIMENTS OF THE INVENTION

In a preferred embodiment of the present invention, 27.3 weight % of powdered calcium- 30 weight percent aluminum alloy is added to an electrically conductive paint vehicle formed by the addition of 55.1 weight % of carbon powder to a mixture containing polyurethane resin dissolved in petroleum distillates to produce a corrosion-preventing paint having a dry resistivity of approximately 280 ohm-cm. When this paint is applied to plain carbon steel and dried, this painted steel is found to exhibit an electrochemical potential of at least as negative as −1.78 volts versus a calomel electrode when tested in seawater at room temperature, and is thus cathodically prevented from corroding since the metal is driven to such a negative electrochemical potential that it becomes the electrochemical cathode. The calcium-aluminum alloy can be effective if it contains from about 0.5 to about 50 weight percent of calcium and from about 99.5 to about 50 weight percent of aluminum, and the resulting electrochemically active paint can be effective if it has a resistivity of less than 100,000 ohms times centimeters. When a small quantity of a corrosion inhibiting agent, such as 0.1% by weight of potassium dichromate is added to the active paint formulation, it has been further discovered that the effective lifetime of the active paint formulation is increased. As determined from the rate of decrease in the measured electrochemical potential, this degree of increase in paint active lifetime is found to be approximately twice that of active paints which do not contain a corrosion inhibitor addition. Without the use of a corrosion inhibiting agent, such as but not limited to potassium dichromate, the paint disclosed in this embodiments found to lose about 34 millivolts of its negative potential over a period of about one year in damp laboratory air such that the painted iron has a voltage of about −1.44 volts when measured against a saturated calomel reference electrode in seawater. With the addition of the inhibiting agent, this decrease rate is found to be reduced to about one half and thus the effective active life of the paint is thus doubled by the use of such an agent.

In a second preferred embodiment powdered magnesium-30 weight percent lithium alloy is added to an electrically conductive paint vehicle formed by the addition of sufficient carbon powder, approximately 55 percent by weight when dry to a mixture containing polyurethane resin dissolved in petroleum distillates to produce a corrosion-preventing paint having a resistivity of approximately 270 ohm-cm. When this paint is applied to plain carbon steel and dried the painted plain carbon steel is found to exhibit an electrochemical potential of −1.1 volts versus a calomel electrode when tested in seawater at room temperature. Magnesium powder or magnesium-aluminum powder can be used in place of the magnesium-lithium powder but with a reduction in electrochemical activity. The lithium content of the magnesium-lithium alloy powder can comprise between 1 and 60 weight percent lithium. The aluminum content of the magnesium-aluminum alloy can range from 1 to 50 weight percent of aluminum.

The paints produced using the procedure described had been found to produce the electrochemical potentials listed in TABLE 2.

TABLE 2

Electrochemical activity of paints produced using selected powdered metals shown in TABLE 1. The Electrochemical potential of these paints is measured against a saturated calomel reference electrode in seawater.

| Paint | Potential |
|---|---|
| Paint using Ca-30 wt % Al powder | −1.78 volts |
| Paint using Mg-30 wt % Li powder | −1.10 volts |
| Paint using Mg powder | −1.01 volts |
| Paint using Mg-10 wt % Al powder | −0.83 volts |
| Paint using Zn powder | −0.71 volts |
| Paint using Al powder | −0.68 volts |

It has been found that for a paint to achieve an electrochemically potential at least as negative as −0.75 volts the electrochemical of the metal pigment itself must be at least as negative as −1.05 volts when measured against a saturated calomel reference electrode in seawater because of the substantial loss in electrochemical activity which occurs when the metal pigment is incorporated into the paint, even with the presence of substantial amounts of carbon. Although Table I only shows three alloys that have such a negative electrochemical potential, it is to be understood that the present invention will also be effective with the use of any alloy which has a negative electrochemical activity at least as negative as −1.05 volts versus saturated calomel reference electrode in seawater.

In an effort to understand the beneficial effect that has been found on the effective lifetime by the use of a corrosion inhibiting agent, such as but not limited to potassium dichromate and sodium dichromate, the effect of potassium dichromate on the electrochemical activity of the metals shown in Table I has been measured as shown in Table 3. As may be seen it is surprisingly found that this known strong corrosion inhibiting agent chemical has but a small effect on the electrochemical activity of these metals. It is thus believed that the beneficial effect on paint active lifetime which results from the use of such agents results from a reduction in the rate of the sacrificial corrosion of the active pigment material. Such corrosion inhibiting agents can beneficially be present to the extent of about 0.01% to 2.0% by weight of the dried paint weight, including the chosen electrochemically active pigment metal weight and the carbon or graphite weight. The carbon or other electrically conductive pigment, such as carbon powder, addition can be added to the extent of between 2 and 85 weight percent of the paint after drying.

TABLE 3

Electrochemical activity of the metals and alloys in TABLE 1 as measured in seawater containing 0.5 weight % of potassium dichromate versus a saturated calomel reference electrode.

| | |
|---|---|
| Calcium-30 wt % aluminum alloy | −1.84 volts |
| Magnesium-30 wt % lithium alloy | −1.64 volts |
| Magnesium | −1.59 volts |
| Magnesium-10 wt % aluminum alloy | −1.41 volts |
| Zinc | −0.82 volts |
| Aluminum | −0.78 volts |
| Antimony | −0.49 volts |
| Lead | −0.45 volts |
| Plain carbon steel | −0.42 volts |
| Tin | −0.40 volts |
| Stainless steel | −0.14 volts |
| Copper | −0.12 volts |
| Silver | +0.006 volts |
| Gold | +0.12 volts |
| Platinum | +0.29 volts |

The paint of the present invention can naturally be applied either upon bare metal or upon metal already painted with a normal corrosion-inhibiting paint, in which case the ability of the paint of the present invention to confer cathodic protection to the metal will be automatically directed to those holidays or gaps in the base paint layer which are most in need of protection. This preferential direction of cathodic protecting ability will be accomplished by the drastic decrease in electrical resistivity of the underlying paint in those regions where coverage of the base metal by the underlying paint is incomplete.

I claim:

1. A corrosion-preventing paint formulation consisting essentially of a vehicle, an electrically conductive pigment, an electrochemically active metal pigment, and a corrosion inhibiting agent, wherein said electrochemically active metal pigment has an electrochemical potential at least as negative as −1.05 volts when measured against a saturated calomel reference electrode in seawater and said corrosion-preventing paint formulation has an electrical resistivity of less than 100,000 ohm-cm when dry, and wherein said electrochemically active metal pigment is selected from the group consisting of magnesium, magnesium-lithium alloy, magnesium-aluminum alloy, and calcium-aluminum alloy powder, said calcium-aluminum alloy having between 0.5 to 50 weight percent calcium, and wherein said magnesium-lithium alloy comprises between 1 to 60 weight percent lithium and said magnesium-aluminum alloy comprises between 1 to 50 weight percent of aluminum and wherein said electrically conductive pigment is selected from the group consisting of carbon black and graphite and wherein said corrosion inhibiting agent is selected from the group consisting of sodium dichromate and potassium dichromate and wherein said corrosion inhibiting agent is present to the extent of between 0.01 and 2.0 percent by weight.

2. A corrosion preventing paint formulation as disclosed in claim 1, wherein said corrosion-preventing paint formulation can produce a potential at least as negative as −0.75 volts when said paint formulation is applied to steel and said steel is then exposed to seawater.

3. An engineering structure coated with a corrosion-preventing paint formulation consisting essentially of a vehicle, an electrically conductive pigment, an electrochemically active metal pigment, and a corrosion inhibiting agent, wherein said electrochemically active metal pigment has an electrochemical potential at least as negative as −1.05 volts when measured against a saturated calomel reference electrode in seawater and said corrosion-preventing paint formulation has an electrical resistivity of less than 100,000 ohm-cm when dry, and wherein said electrochemically active metal pigment is selected from the group consisting of magnesium, magnesium-lithium alloy, magnesium-aluminum alloy, and calcium-aluminum alloy powder, said calcium-aluminum alloy having between 0.5 to 50 weight percent calcium, and wherein said magnesium-lithium alloy comprises between 1 to 60 weight percent lithium and said magnesium-aluminum alloy comprises between 1 to 50 weight percent of aluminum and wherein said electrically conductive pigment is selected from the group consisting of carbon black and graphite and wherein said corrosion inhibiting agent is selected from the group consisting of sodium dichromate and potassium dichromate and wherein said corrosion inhibiting agent is present to the extent of between 0.01 and 2.0 percent by weight.

4. The process of cathodic protection of engineering structures using an electrochemically active paint consisting essentially of a vehicle, an electrically conductive pigment, an electrochemically active metal pigment, and a corrosion inhibiting agent, wherein said electrochemically active metal pigment has an electrochemical potential at least as negative as −1.05 volts when measured against a saturated calomel reference electrode in seawater and said electrochemically active paint has an electrical resistivity of less than 100,000 ohm-cm when dry, and wherein said electrochemically active metal pigment is selected from the group consisting of magnesium, magnesium-lithium alloy, magnesium-aluminum alloy, and calcium-aluminum alloy powder, said calcium-aluminum alloy having between 0.5 to 50 weight percent calcium, and wherein said magnesium-lithium alloy comprises between 1 to 60 weight percent lithium and said magnesium-aluminum alloy comprises between 1 to 50 weight percent of aluminum and wherein said electrically conductive pigment is selected from the group consisting of carbon black and graphite and wherein said corrosion inhibiting agent is selected from the group consisting of sodium dichromate and potassium dichromate and wherein said corrosion inhibiting agent is present to the extent of between 0.01 and 2.0 percent by weight, said process consisting of the steps of applying said paint to an engineering structure, and drying said paint, whereby said engineering structure is electrochemically protected.

* * * * *